United States Patent
Peng et al.

(10) Patent No.: US 10,382,953 B2
(45) Date of Patent: Aug. 13, 2019

(54) CONFIGURATION METHOD, PROSE KEY MANAGEMENT FUNCTIONAL ENTITY, TERMINAL, SYSTEM, AND STORAGE MEDIUM

(71) Applicant: ZTE Corporation, Shenzhen (CN)

(72) Inventors: Jin Peng, Shenzhen (CN); Shilin You, Shenzhen (CN); Zhaoji Lin, Shenzhen (CN); Zaifeng Zong, Shenzhen (CN); Li Zhu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 290 days.

(21) Appl. No.: 15/306,852

(22) PCT Filed: Jul. 14, 2014

(86) PCT No.: PCT/CN2014/082115
§ 371 (c)(1),
(2) Date: Nov. 11, 2016

(87) PCT Pub. No.: WO2015/165149
PCT Pub. Date: Nov. 5, 2015

(65) Prior Publication Data
US 2017/0118637 A1    Apr. 27, 2017

(30) Foreign Application Priority Data
Apr. 30, 2014 (CN) .......................... 2014 1 0182882

(51) Int. Cl.
*H04L 9/00* (2006.01)
*H04W 12/04* (2009.01)
(Continued)

(52) U.S. Cl.
CPC ........... *H04W 12/04* (2013.01); *H04L 63/205* (2013.01); *H04W 76/14* (2018.02)

(58) Field of Classification Search
CPC .... H04W 12/04; H04L 63/205; H04L 9/0816; H04L 9/083; H04L 63/064; H04L 9/08; H04L 9/0819; H04L 63/062
See application file for complete search history.

(56) References Cited

U.S. PATENT DOCUMENTS

2010/0009675 A1    1/2010    Wijting
2011/0258313 A1    10/2011   Mallik
(Continued)

FOREIGN PATENT DOCUMENTS

CN    101001252 A    7/2007
CN    101771586 A    7/2010
(Continued)

OTHER PUBLICATIONS

International Search Report in international application No. PCT/CN2014/082115, dated Feb. 17, 2015.
(Continued)

*Primary Examiner* — Brandon S Hoffman
*Assistant Examiner* — Helai Salehi
(74) *Attorney, Agent, or Firm* — Oppedahl Patent Law Firm LLC

(57) ABSTRACT

The disclosure discloses a security configuration method for Device to Device (D2D) communication, a Proximity-based Service (ProSe) key management function, User Equipment (UE) and a system. The method includes that: first information indicating security capability of a UE is acquired; and whether to feed back a security configuration response message or a content of the security configuration response message to the UE is determined according to the first information. The disclosure further discloses a computer storage medium.

13 Claims, 4 Drawing Sheets

(51) Int. Cl.
  *H04L 29/06* (2006.01)
  *H04W 76/14* (2018.01)

(56) References Cited

U.S. PATENT DOCUMENTS

| | | | |
|---|---|---|---|
| 2012/0082091 A1 | 4/2012 | Siomina | |
| 2012/0258703 A1 | 10/2012 | Hakola | |
| 2013/0287012 A1 | 10/2013 | Pragada et al. | |
| 2014/0038590 A1 | 2/2014 | Wijting | |
| 2014/0337432 A1 | 11/2014 | Mallik et al. | |
| 2015/0382189 A1* | 12/2015 | Zhang | H04W 12/04 380/285 |

FOREIGN PATENT DOCUMENTS

| | | | |
|---|---|---|---|
| CN | 101771659 A | 7/2010 | |
| CN | 102711105 A | 10/2012 | |
| CN | 102812688 A * | 12/2012 | H04W 12/04 |
| CN | 102812688 A | 12/2012 | |
| CN | 102833742 A | 12/2012 | |
| CN | 102972050 A | 3/2013 | |
| CN | 103119966 A | 5/2013 | |
| CN | 103297961 A | 9/2013 | |
| EP | 2955897 B1 * | 8/2018 | |
| WO | 2013170668 A1 | 11/2013 | |

OTHER PUBLICATIONS

English Translation of the Written Opinion of the International Search Authority in international application No. PCT/CN2014/082115, dated Feb. 17, 2015.
33803-040: Study on security issues to support Proximity Services Feb. 28, 2014.
Supplementary European Search Report in European application No. 14890638.1, dated Jun. 6, 2017.
"3rd Generation Partnership Project;Technical Specification Group Services and System Aspects; Proximity based Services;Stage 2 (Release 12)",3GPP Standard; 3GPP TS 23303, 3rd Generation Partnership Project (3GPP),Mobile Competence Centre; 650, Route Deslucioles ; F-06921 Sophia-Antipolis Ceder: France,vol. SA WG2, No. V0.2.1, Feb. 26, 2014 (Feb. 6, 2014), pp. 1-52,XP050769525.
"3rd Generation Partnership Project; Technical Specification Group Services and System Aspects, Study on security issues to support Proximity Services (Release12)",3GPP TR 33.833 V0.4.0, Feb. 1, 2014 (Feb. 1, 2014), pp. 1-73,XP055232252,Retrieved from the Internet:URL:www.3gpp.org.

* cited by examiner

CONFIGURATION METHOD, PROSE KEY MANAGEMENT FUNCTIONAL ENTITY, TERMINAL, SYSTEM, AND STORAGE MEDIUM

TECHNICAL FIELD

The disclosure relates to a security technology in the field of communication, and in particular to a configuration method, a Proximity-based Service (ProSe) key management function, User Equipment (UE), a system and a storage medium.

BACKGROUND

Along with development of a communication technology, an Evolved Packet System (EPS) is further provided on the basis of a 3rd Generation Partnership Project (3GPP) communication system. An EPS includes an Evolved Universal Terrestrial Radio Access Network (E-UTRAN) and an Evolved Packet Core Network (EPC).

An EPC includes a Home Subscriber Server (HSS), a Mobility Management Entity (MME), a Serving General Packet Radio Service (GPRS) Support Node (SGSN), a Policy and Charging Rule Function (PCRF), a Serving Gateway (S-GW), a Packet Data Network Gateway (P-GW) and a Packet Data Network (PDN).

An EPS usually serves as an intermediate node for communication between two pieces of equipment. Both communication UE accesses the EPS, and implements communication through relay of the EPS. Along with development of communication technology, a Device to Device (D2D) service for direct communication between two adjacent UEs emerges, and the D2D service is also called as a ProSe. In D2D service, two UEs which are close to each other may directly communicate with each other, and data transmitted by equipment may be directly transmitted without returning to a core network. D2D communication may reduce circuitous routing of data on one hand, and may also reduce network data load on the other hand.

FIG. 1 is a structure diagram of a communication system for a D2D service. The communication system includes two UEs performing D2D communication, i.e. UE1 and UE2 respectively. Each UE may access an EPC only through an E-UTRAN, and each UE may belong to the same Public Land Mobile Network (PLMN) or belong to two PLMNs respectively. A PLMN corresponding to one UE may be a Home PLMN (HPLMN) or a Visited PLMN (VPLMN) that the UE accesses from another PLMN. The PLMN of an area where the UE is currently located on may be generally referred to as a Local PLMN (LPLMN), no matter whether the LPLMN is an HPLMN or a VPLMN. In order to implement a D2D discovery service, an operator side not only deploys an EPS, but also includes a ProSe Application (APP) server for deploying the D2D discovery service. The ProSe APP server may be provided by a service provider operating a D2D service, and may also be provided by a network operator operating the EPS. ProSe key management functions are also deployed in different PLMNs. For two UEs of a ProSe service, one UE acquires a service code which may be announced after acquiring a service identifier from the ProSe key management function. The UE becomes Announcing UE (A-UE), and the other UE accepts announcement from the A-UE and matches the ProSe key management function of the A-UE. If the matching is successful, the UE executes the ProSe service with the A-UE. Accordingly, the non-announcing UE becomes a Monitoring UE (M-UE).

In FIG. 1, UE1 is positioned in its HPLMN, and UE2 temporally roams in a VPLMN that UE2 is visiting. The UE provides related ProSe APPs, a connecting interface connecting to the ProSe APP server is the interface of PC1, and a related authentication function is acquired through PC1.

An interface between UEs is PC5, and is configured for direct discovery and communication between UEs.

Interfaces between the UE and the ProSe key management functions are PC3, and are configured to pass discovery authentication of a network.

Interfaces between the ProSe key management function and an existing EPC is PC4, include a user plane interface with a P-GW and a control plane interface with an HSS, and are configured for discovery authentication of a D2D discovery service.

Interfaces between a ProSe key management function and the ProSe APP server are PC2, and are configured for APP implementation of the D2D discovery service.

There are interfaces PC6 and PC7 between a ProSe key management function and another ProSe key management function respectively, and they are configured for the two conditions of roaming and non-roaming of the UE respectively. Interface PC7 is adopted when the UE roams, and interface PC6 is adopted when the UE does not roam, and the two interfaces are configured for information interaction between two ProSe key management functions during the D2D discovery service of the UE.

During specific D2D communication, a UE is required to acquire some information about communication from a ProSe key management function, and performs communication according to the information. However, the UE may not normally perform D2D communication sometimes when the UE has received related information of D2D communication sent from the ProSe key management function, and as a result the D2D communication failed. Particularly in a one-to-many D2D communication process, such a phenomenon is more obvious.

SUMMARY

In view of this, the disclosure is intended to provide a novel security configuration method for D2D communication, a ProSe key management function, UE, a system and a storage medium, so as to reduce a probability of a D2D communication failure after equipment receives ProSe information.

In order to achieve the purpose, the technical solutions of an embodiment of the disclosure are implemented as follows.

A first aspect of the embodiment of the disclosure provides a D2D communication security configuration method for D2D communication, which may include that:

first information indicating security capability of a UE is acquired; and whether to feed back a security configuration response message or a content of the security configuration response message to the UE is determined according to the first information.

In an exemplary embodiment the first information may include a security algorithm set supported by the UE.

In an exemplary embodiment, the step that the content of the security configuration response message is determined according to the first information may include that:

whether the security algorithm set supported by the UE includes a group security algorithm to be sent is judged;

when the security algorithm set supported by the UE includes the group security algorithm, it is determined that the security configuration response message fed back to the UE includes the group security algorithm; and when the security algorithm set supported by the UE does not include the group security algorithm, it is determined that the security configuration response message fed back to the UE includes a security configuration failure indication.

In an exemplary embodiment, the method may include that:

the step that whether to feed back the security configuration response message to the UE s determined according to the first information may include that:

whether the security algorithm set supported by the UE includes a group security algorithm to be sent is judged;

when the security algorithm set supported by the UE includes the group security algorithm, the security configuration response message fed back to the UE includes the group security algorithm; and when the security algorithm set supported by the UE does not include the group security algorithm, the security configuration response message is not fed back to the UE.

In an exemplary embodiment, the group security algorithm may include a group encryption algorithm and a group integrity algorithm.

A second aspect of the embodiment of the disclosure provides a security configuration method for D2D communication, which may include that:

first information indicating security capability of a UE is sent to a ProSe key management function, the first information being configured to provide a basis for the ProSe key management function to determine whether to feed back a security configuration response message or a content of the security configuration response message to the UE; and the security configuration response message fed back by the ProSe key management function on the basis of the first information is received.

In an embodiment, the first information may include a security algorithm set supported by the UE.

In an embodiment, when the security algorithm set supported by the UE includes a group security algorithm to be sent by the ProSe key management function, the security configuration response message may include the group security algorithm; and when the security algorithm set supported by the UE does not include the group security algorithm to be sent by the ProSe key management function, the security configuration response message may include a security configuration failure indication.

In an exemplary embodiment, the method may further include that:

the security configuration response message including the group security algorithm is received within a specified time; and if the security configuration response message is not received within the specified time, it is determined that security configuration fails.

In an exemplary embodiment, the group security algorithm may include a group encryption algorithm and a group integrity algorithm.

In an exemplary embodiment, the step that the first information indicating the security capability of the UE is sent to the ProSe key management function may be implemented as follows:

a security configuration request message is sent to the ProSe key management function, the security configuration request message containing the first information indicating the security capability of the UE.

A third aspect of the embodiment of the disclosure provides a security configuration method for D2D communication, which may include that:

a ProSe key management function acquires first information indicating security capability of a UE;

the ProSe key management function determines whether to feed back a security configuration response message or a content of the security configuration response message to the UE according to the first information;

the ProSe key management function sends the determined security configuration response message; and the UE receives the security configuration response message.

In an exemplary embodiment, the method may include that:

the UE sends the first information to the ProSe key management function; and the step that the ProSe key management function acquires the first information indicating the security capability of the UE may be implemented as follows:

the ProSe key management function receives the first information sent by the UE.

In an exemplary embodiment, the step that the UE sends the first information to the ProSe key management function may be implemented as follows:

the UE sends a security configuration request message to the ProSe key management function, the security configuration request message containing the first information indicating the security capability of the UE.

In an exemplary embodiment, the first information may include a security algorithm set supported by the UE.

In an exemplary embodiment, the step that the ProSe key management function determines the content of the security configuration response message fed back to the UE according to the first information may include that:

the ProSe key management function judges whether the security algorithm set supported by the UE includes a group security algorithm to be sent;

when the security algorithm set supported by the UE includes the group security algorithm, the ProSe key management function determines that the security configuration response message fed back to the UE includes the group security algorithm; and when the security algorithm set supported by the UE does not include the group security algorithm, the ProSe key management function determines that the security configuration response message fed back to the UE includes a security configuration failure indication.

In an exemplary embodiment, the step that the ProSe key management function determines whether to feed back the security configuration response message to the UE according to the first information may include that:

the ProSe key management function judges whether the security algorithm set supported by the UE includes a group security algorithm to be sent;

when the security algorithm set supported by the UE includes the group security algorithm, the ProSe key management function determines to feed back the security configuration response message to the UE and determines that the security configuration response message includes the group security algorithm; and when the security algorithm set supported by the UE does not include the group security algorithm, the ProSe key management function determines not to feed back the security configuration response message to the UE.

In an exemplary embodiment, when the ProSe key management function determines to feed back the security configuration response message to the UE, the step that the ProSe key management function sends the determined security configuration response message may be implemented as follows: the ProSe key management function feeds back the security configuration response message to the UE within a specified time; and the step that the UE receives the security configuration response message may be implemented as follows: the UE receives the security configuration response message within the specified time, and if the security configuration response message is not received within the specified time, the UE determines that security configuration fails.

A fourth aspect of the embodiment of the disclosure provides a ProSe key management function, which may include:

an acquisition unit, configured to acquire first information indicating security capability of a UE; and a first determination unit, configured to determine whether to feed back a security configuration response message or a content of the security configuration response message to the UE according to the first information.

In an exemplary embodiment, the first information may include a security algorithm set supported by the UE.

In an exemplary embodiment, the first determination unit may include:

a judgment module, configured to judge whether the security algorithm set supported by the UE includes a group security algorithm to be sent; and a first determination module, configured to, when the security algorithm set supported by the UE includes the group security algorithm, determine that the security configuration response message fed back to the UE includes the group security algorithm, and when the security algorithm set supported by the UE does not include the group security algorithm, determine that the security configuration response message fed back to the UE includes a security configuration failure indication.

In an exemplary embodiment, the first determination unit may include:

a judgment module, configured to judge whether the security algorithm set supported by the UE includes a group security algorithm to be sen; and a second determination module, configured to, when the security algorithm set supported by the UE includes the group security algorithm, determine that the security configuration response message fed back to the UE includes the group security algorithm, and when the security algorithm set supported by the UE does not include the group security algorithm, not to feed back the security configuration response message to the UE.

In an exemplary embodiment, the group security algorithm may include a group encryption algorithm and a group integrity algorithm.

In an exemplary embodiment, the acquisition unit may be configured to receive a security configuration request message sent by the UE; and the security configuration request message may contain the first information indicating the security capability of the UE.

A fifth aspect of the embodiment of the disclosure provides a UE, which may include:

a sending unit, configured to send first information indicating security capability of the UE to a ProSe key management function, the first information being configured to provide a basis for the ProSe key management function to determine whether to feed back a security configuration response message t or a content of the security configuration response message to the UE; and a receiving unit, configured to receive the security configuration response message fed back by the ProSe key management function on the basis of the first information.

Preferably, the first information may include a security algorithm set supported by the UE.

Preferably, when the security algorithm set supported by the UE includes a group security algorithm to be sent by the ProSe key management function, the security configuration response message may include the group security algorithm; and when the security algorithm set supported by the UE does not include the group security algorithm to be sent by the ProSe key management function, the security configuration response message may include a security configuration failure indication.

In an exemplary embodiment, the receiving unit may further be configured to receive the security configuration response message including the group security algorithm within a specified time;

the UE may further include a second determination unit; and the second determination unit may be configured to, if the security configuration response message is not received within the specified time, determine that security configuration fails.

In an exemplary embodiment, the group security algorithm may include a group encryption algorithm and a group integrity algorithm.

In an exemplary embodiment, the sending unit may be configured to send a security configuration request message to the ProSe key management function, the security configuration request message containing the first information indicating the security capability of the UE.

A sixth aspect of the embodiment of the disclosure provides a communication system, which may include:

a ProSe key management function, configured to acquire first information indicating security capability of a UE, determine whether to feed back a security configuration response message or a content of the security configuration response message to the UE according to the first information, and send the determined security configuration response message; and the UE, configured to receive the security configuration response message.

In an exemplary embodiment, the system may include:

the UE, further configured to send the first information to the ProSe key management function; and the ProSe key management function, configured to receive the first information sent by the UE.

In an exemplary embodiment, the UE may be configured to send a security configuration request message to the ProSe key management function, the security configuration request message containing the first information indicating the security capability of the UE.

In an exemplary embodiment, the first information may include a security algorithm set supported by the UE.

In an exemplary embodiment, the ProSe key management function may be configured to judge whether the security algorithm set supported by the UE includes a group security algorithm to be sent; when the security algorithm set supported by the UE includes the group security algorithm, determine that the security configuration response message fed back to the UE includes the group security algorithm; and when the security algorithm set supported by the UE does not include the group security algorithm, determine that the security configuration response message fed back to the UE includes a security configuration failure indication.

In an exemplary embodiment, the ProSe key management function may be configured to judge whether the security algorithm set supported by the UE includes the group security algorithm to be sentt; when the security algorithm set supported by the UE includes the group security algorithm, determine to feed back the security configuration response message to the UE and the security configuration response message includes the group security algorithm; and when the security algorithm set supported by the UE does not include the group security algorithm, determine not to feed back the security configuration response message to the UE.

In an exemplary embodiment, when the ProSe key management function determines to feed back the security configuration response message to the UE, the ProSe key management function may be configured to feed back the security configuration response message to the UE within a specified time; and the UE may be configured to receive the security configuration response message within the specified time, and if the security configuration response message is not received within the specified time, determine that security configuration fails.

A seventh aspect of the embodiment of the disclosure further provides a computer storage medium, in which a computer-executable instruction may be stored, the computer-executable instruction being configured to execute at least one of the methods provided by the first aspect to third aspect of the embodiment of the disclosure.

According to the security configuration method for D2D communication, ProSe key management function, UE, communication system and computer storage medium of the embodiment of the disclosure, the UE actively sends the first information indicating the security capability of the UE to the ProSe key management function, and then the ProSe key management function may judge whether the UE supports the D2D communication requested by the UE to further determine whether it is necessary to send the security configuration response message or the content of the security configuration response message according to the first information; when the UE does not support the requested D2D communication, the ProSe key management function does not send the security configuration response message or determines that the security configuration response message only includes the security configuration failure indication and has the characteristic of small information amount compared with a security configuration message including a group security key; therefore, sending of the security configuration response message when the UE does not support the requested D2D communication is reduced, which reduces data volume of interaction between the ProSe key management function and the UE and prolongs standby time of the UE; and meanwhile, sending of the group security key and the like is avoided, thereby reducing security leakage source and improving communication security.

DETAILED DESCRIPTION

Preferred embodiments of the disclosure will be described below with reference to the drawings in detail, and it should be understood that the preferred embodiments described below are only adopted to describe and explain the disclosure and not intended to limit the disclosure.

Embodiment 1

Figure 2:
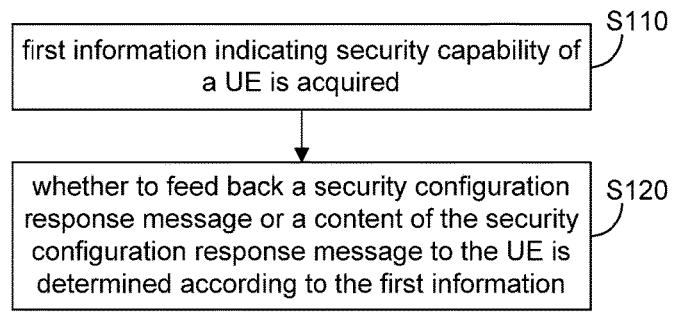
FIG. 2 is a first flowchart of a security configuration method for D2D communication according to an embodiment of the disclosure.

As shown in FIG. 2, the embodiment provides a security configuration method for D2D communication, which includes:

At Step 110: first information indicating security capability of a UE is acquired; and At Step 120: whether to feed back security configuration response message to the UE or not or content of the security configuration response message is determined according to the first information.

A main body for executing Step 110 to Step 120 is a device including a ProSe key management function; and the device is arranged in network equipment on a network side, specifically such as a ProSe APP server. In a specific execution process, after Step 120, the method further includes a step that the response message is sent to the UE.

Figure 3:
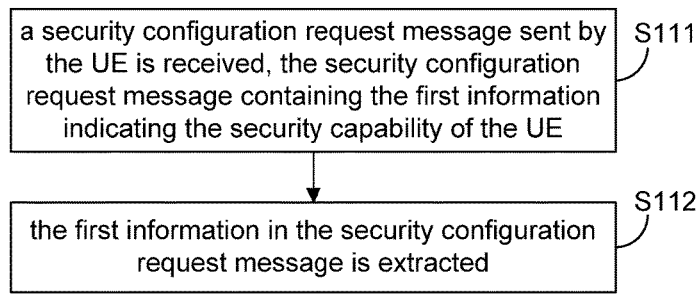
FIG. 3 is a flowchart of acquiring first information according to an embodiment of the disclosure.

Particularly, there may be many methods for acquiring the first information in Step 110, for example, a method of querying a database recording the security capability of the UE and the like. Or, the first information is directly received from the UE, and in such a manner, the security capability of the UE may be conveniently and rapidly acquired by information interaction with the UE once. In addition, the embodiment provides a preferred method, and as shown in FIG. 3. Step 110 may include:

At Step 111: a security configuration request message sent by the UE is received, the security configuration request message containing the first information indicating the security capability of the UE; and At Step 112: the first information in the security configuration request message is extracted.

The first information is carried in the security configuration request message, and the first information is received through and together with the security configuration request message, so that the frequency of information interaction between the UE and a base station is reduced, and power consumption of the UE is reduced.

In the embodiment, the security configuration request message received by the ProSe key management function contains the first information indicating the security capability of the UE. The ProSe key management function may judge whether the UE has a security capability of supporting a service requested by it according to the first information to further determine whether to send the security configuration response message or the content of the security configuration response message to the UE. Whether the UE can perform D2D communication is notified to the UE by determining whether the security configuration response message is sent or the content thereof, and meanwhile, an information security problem caused by sending important information such as a group security algorithm in security configuration information to a UE which cannot perform corresponding D2D communication is solved. Therefore, the probability that the UE may not perform communication due to its own capability problem when the UE receives information for D2D communication is also lowered.

In Step 110, the security capability of the UE may be represented by multiple parameters, and specifically, the first information preferably includes a security algorithm set supported by the UE in the embodiment. The ProSe key management function receives the first information and acquires the security algorithm set supported by the UE; if the security algorithm set includes a security algorithm to be adopted for a D2D communication service currently requested by the UE, it is indicated that the security capability of the UE supports the D2D communication requested by or to be performed by the UE, and then the ProSe key management function may send the security configuration response message including the group security algorithm to the UE; otherwise, no information is sent or the security configuration response message which does not includes the group security algorithm but includes a security configuration failure indication is directly sent.

Specific execution of Step 120 may include two solutions.

First Solution:

whether the security algorithm set supported by the UE includes a group security algorithm to be sent is judged;

when the security algorithm set supported by the UE includes the group security algorithm, it is determined that the security configuration response message fed back to the UE includes the group security algorithm; and when the security algorithm set supported by the UE does not include the group security algorithm, it is determined that the security configuration response message fed back by the UE includes a security configuration failure indication.

Second Solution:

whether the security algorithm set supported by the UE includes a group security algorithm to be sent is judged;

when the security algorithm set supported by the UE includes the group security algorithm, the security configuration response message fed back to the UE includes the group security algorithm; and when the security algorithm set supported by the UE does not include the group security algorithm, the security configuration response message is not fed back to the UE.

In a specific execution process, when the security algorithm set supported by the UE includes the group security algorithm, the security configuration response message may further include a group key, an expiration time of the group key, a group identifier of the UE, a security algorithm which may be adopted for protecting data when the UE sends and receives the data, and the like.

In an embodiment, the group security algorithm includes a group encryption algorithm and a group integrity algorithm.

The group encryption algorithm may include a SNOW-3G-based encryption algorithm, an Advanced Encryption Standard (AES)-based encryption algorithm and a ZUC-based encryption algorithm.

The group integrity algorithm may include a SNOW-3G-based integrity algorithm, an AES-based integrity algorithm and a ZUC-based integrity algorithm.

The D2D communication security configuration method in the embodiment of the disclosure is particularly applied to one-to-many D2D communication (one UE performs D2D communication with multiple UEs at the same time), the phenomenon that a security configuration response message including a group security algorithm is still received from the ProSe key management function when the UE does not support the group security algorithm required by one-to-many D2D communication may be avoided. Unnecessary data transmission between the ProSe key management function and the UE is avoided, and a security problem caused by unnecessary transmission of the group security algorithm is solved. Moreover, the probability that the UE cannot perform D2D communication after receiving the security configuration response message including the group security algorithm is lowered.

Embodiment 2

Figure 4:
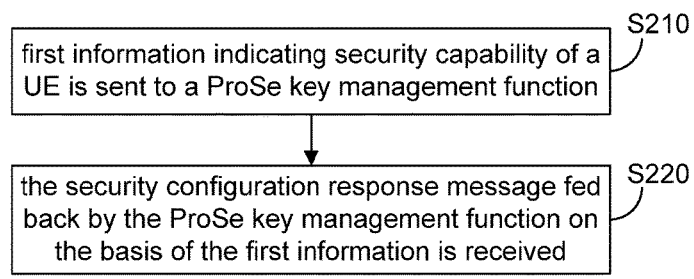
FIG. 4 is a second flowchart of acquiring first information according to an embodiment of the disclosure.

As shown in FIG. 4, the embodiment provides a security configuration method for D2D communication, which includes:

At Step 210: first information indicating security capability of a UE is sent to a ProSe key management function, the first information being configured to provide a basis for the ProSe key management function to determine whether to feed back a security configuration response message or content of the security configuration response message to the UE; and At Step 220: the security configuration response message fed back by the ProSe key management function on the basis of the first information is received.

In the embodiment, the UE actively sends the first information indicating its security capability to the ProSe key management function, and then the ProSe key management function may conveniently determine whether to send the security configuration response message or the content of the security configuration response message to the UE according to the first information, so that the probability that the UE cannot perform D2D communication after receiving the security configuration response message including a group security algorithm is lowered. Similarly, the security configuration method for D2D communication of the embodiment is applicable to various kinds of D2D communication, and is particularly applicable to one-to-many D2D communication.

In the embodiment, there are many methods for sending the first information to the ProSe key management function in Step 21. A special message may be adopted to contain the first information, and in the embodiment, the first information is preferably carried by a security configuration request message and the first information is sent by sending the security configuration request message to the ProSe key management function, so that compatibility with a conventional art is achieved, and compared with adoption of special information for sending the first information, adoption of the security configuration request message has the advantages that the frequency of information interaction between a UE and the ProSe key management function is reduced and power consumption of the UE is further reduced.

In a specific implementation process, the first information preferably includes a security algorithm set supported by the UE.

After the UE sends the first information, the UE may know whether it supports D2D communication which is requested or to be performed in at least two manners according to a communication protocol predetermined by the UE and the ProSe key management function. The two manners respectively are set as follows.

First:

when the security algorithm set supported by the UE includes a group security algorithm to be sent by the ProSe key management function, the security configuration response message includes the group security algorithm; and when the security configuration algorithm set supported by the UE does not include the group security algorithm to be sent by the ProSe key management function, the security configuration response message includes a security configuration failure indication.

In such a manner, the security configuration response message sent by the ProSe key management function may be received no matter whether the security configuration algorithm set supported by the UE includes the group security algorithm to be sent by the ProSe key management function, and the difference is a content of the security configuration response message. Usually when the security configuration algorithm set supported by the UE does not include the group security algorithm to be sent by the ProSe key management function, the security configuration response message does not include information such as the group security algorithm, and may only include the security configuration failure indication.

Second:

the UE receives the security configuration response message including the group security algorithm within a specified time after sending the first information; and if the security configuration response message is not received within the specified time, it is determined that security configuration fails.

The specified time is predetermined by the UE and the ProSe key management function, and when the security algorithm set supported by the UE includes the group security algorithm to be sent by the ProSe key management function, the UE may receive the security configuration response message including the group security algorithm within the specified time; and when the security configuration response message is not received within the specified time, it is indicated that security configuration fails and the security capability of the UE does not meet a requirement. In such a manner, whether the UE can perform D2D communication is judged according to whether the security configuration response message is received within the specified time, so that the problem of incapability for a UE in D2D communication due to its own security capability when receiving the security configuration response message is solved.

The security configuration response message received in Step 220 includes weight configuration information sent when the ProSe key management function executes two manners, and is specifically a security configuration response message including the group security algorithm or a security configuration response message which does not include the group security algorithm but includes the security configuration failure indication.

In an embodiment, the group security algorithm includes a group encryption algorithm and a group integrity algorithm. Specifically, contents and functions of the group encryption algorithm and the group integrity algorithm may refer to the corresponding part in embodiment 1.

Embodiment 3

Figure 5:
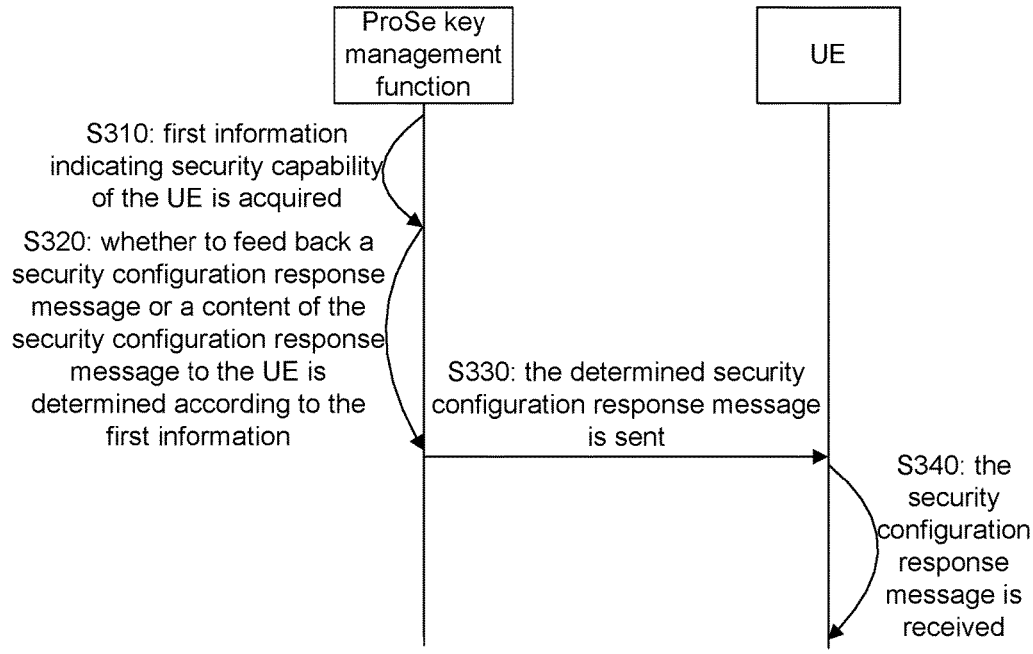
FIG. 5 is a third flowchart of acquiring first information according to an embodiment of the disclosure.

As shown in FIG. 5, the embodiment provides a security configuration method for D2D communication, which includes:

At Step 310: a ProSe key management function acquires first information indicating security capability of a UE;

At Step 320: the ProSe key management function determines whether to feed back a security configuration response message or a content of the security configuration response message to the UE according to the first information;

At Step 330: the ProSe key management function sends the determined security configuration response message; and At Step 340: the UE receives the security configuration response message.

Particularly, specific execution manners for the steps executed by the ProSe key management function in the embodiment may refer to the security configuration method for D2D communication in embodiment 1; and specifically for example, the first information may be acquired by a method of querying or receiving from the UE in Step 310. The security configuration response message received in Step 340 may be a security configuration response message including a group security algorithm, and may also be a security configuration response message with a security configuration failure indication; and a specific content of the security configuration response message may also refer to the corresponding part in embodiment 1.

From the above, the embodiment provides a security configuration method for D2D communication based on interaction of double sides on the basis of embodiment 1 and embodiment 2. Unnecessary data transmission between the ProSe key management function and the UE is also avoided, and a security problem caused by unnecessary transmission of the group security algorithm is solved. Moreover, the probability that the UE cannot perform D2D communication after receiving the security configuration response message including the group security algorithm is lowered.

In an embodiment, the method includes that:

the UE sends the first information to the ProSe key management function, and particularly the first information may preferably include a security algorithm set supported by the UE.

At Step 310 is implemented as follows:

the ProSe key management function receives the first information sent by the UE.

According to the embodiment, the ProSe key management function may acquire the first information by information interaction between the UE and the ProSe key management function, and the advantages of high speed and convenience for implementation are achieved.

The step that the UE sends the first information to the ProSe key management function is implemented as follows: the UE sends a security configuration request message to the ProSe key management function, the security configuration request message containing the first information indicating the security capability of the UE.

In the embodiment, carrying the first information in the security configuration request message for sending has the advantages of high compatibility with the conventional art, reduction in a frequency of information interaction between the UE and the ProSe key management function and reduction in power consumption of the UE.

Multiple manners may specifically be adopted for Step 320, and the following two preferred manners are provided.

Preferred manner 1:

Step 320 includes that:

the ProSe key management function judges whether the security algorithm set supported by the UE includes a group security algorithm to be sent;

when the security algorithm set supported by the UE includes the group security algorithm, the ProSe key management function determines that the security configuration response message fed back by the UE includes the group security algorithm; and when the security algorithm set supported by the UE does not include the group security algorithm, the ProSe key management function determines that the security configuration response message fed back to the UE includes a security configuration failure indication.

The method further includes that:

the ProSe key management function sends the determined security configuration response message to the UE.

Preferred manner 2:

Step 320 may include that:

the ProSe key management function judges whether the security algorithm set supported by the UE includes a group security algorithm to be sent;

when the security algorithm set supported by the UE includes the group security algorithm, the ProSe key management function determines to feed back the security configuration response message to the UE and determines that the security configuration response message includes the group security algorithm; and when the security algorithm set supported by the UE does not include the group security algorithm, the ProSe key management function determines not to feed back the security configuration response message to the UE.

When the preferred manner 1 is adopted, the ProSe key management function notifies the UE whehter the UE may support D2D communication through the security configuration response message; when the preferred manner 2 is adopted, whether the UE may support D2D communication is indicated to the UE according to whether the ProSe key management function sends the security configuration response message within a specified time; and during specific implementation, one manner is selected for D2D security configuration according to a requirement.

When the preferred manner 2 is adopted, when the ProSe key management function determines to feed back the security configuration response message to the UE, the step that the ProSe key management function sends the determined security configuration response message is implemented as follows:

the ProSe key management function feeds back the security configuration response message to the UE within a specified time; and the step that the UE receives the security configuration response message is implemented as follows:

the UE receives the security configuration response message within the specified time, if the security configuration response message is not received within the specified time, the UE determines that security configuration fails, and if the security configuration response message is received within the specified time, the UE determines that security configuration succeeds, and subsequently performs D2D communication according to the content of the security configuration response message.

Embodiment 4

Figure 6:
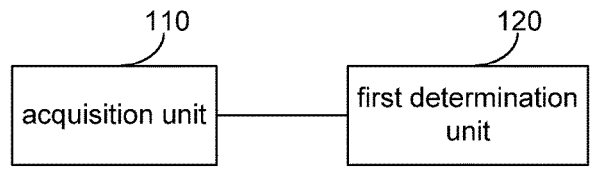
FIG. 6 is a structure diagram of a ProSe key management function according to an embodiment of the disclosure.

As shown in FIG. 6, the embodiment provides a ProSe key management function, which includes:

an acquisition unit 110, configured to acquire first information indicating security capability of a UE; and a first determination unit 120, configured to determine whether to feed back a security configuration response message or a content of the security configuration response message to the UE according to the first information.

Different specific structures are adopted for the acquisition unit 110 according to different manners for acquiring the first information; and when the acquisition unit 110 is configured to acquire the first information by querying a database, the specific structure of the acquisition unit 110 may include a processor and a communication interface or communication bus connected with the database. When the acquisition unit 110 receives the first information sent by the UE, the acquisition unit 110 includes a communication interface connected with peripheral, such as a receiving antenna; and the receiving antenna is wirelessly connected with the UE through a wireless connection technology.

A specific structure of the first determination unit 120 may also be a processor; and the processor is connected with a storage medium, and determines whether to feed back the security configuration response message to the UE or determine the content of the security configuration response message by running an executable instruction.

The processor may be an electronic component with a processing function or a combination of such electronic components (such as a central processing unit, a microprocessor, a single-chip microcomputer, a digital signal processor and a programmable logic array.

The ProSe key management function of the embodiment specifically and independently corresponds to a physical device, and may also be integrated with another function in a network in a corresponding physical device (specifically such as equipment of a ProSe server and the like in the network).

From the above, the ProSe key management function of the embodiment provides a hardware support for the security configuration method for D2D communication of embodiment 1, and may be configured to implement any technical solution in method embodiment 1. This ProSe key management function of the embodiment also has the advantages of reducing data volume of interaction between the ProSe key management function and the UE, prolonging standby time of the UE, avoiding sending of a group security key and the like, reducing security leakage source, improving communication security and the like.

The first information acquired by the acquisition unit 110 may be a security algorithm set supported by the UE according to an embodiment.

Multiple structures may be adopted for the first determination unit 120, and the following two preferred structures will be provided.

The first determination unit includes:

a judgment module, configured to judge whether the security algorithm set supported by the UE includes a group security algorithm to be sent; and a first determination module, configured to, when the security algorithm set supported by the UE includes the group security algorithm, determine that the security configuration response message fed back to the UE includes the group security algorithm, and when the security algorithm set supported by the UE does not include the group security algorithm, determine that the security configuration response message fed back by the UE includes a security configuration failure indication.

Second:

the first determination unit includes:

a judgment module, configured to judge whether the security algorithm set supported by the UE includes a group security algorithm to be sent; and a second determination module, configured to, when the security algorithm set supported by the UE includes the group security algorithm, determine that the security configuration response message is fed back to the UE includes the group security algorithm, and when the security algorithm set supported by the UE does not include the group security algorithm, the security configuration response message is not fed back to the UE.

The acquisition unit 110 is configured to receive a security configuration request message sent by the UE; and the security configuration request message contains the first information indicating the security capability of the UE.

When the acquisition unit 110 acquires the first information by receiving the security configuration request message, the specific structure of the acquisition unit 110 may be a receiving antenna; and the acquisition unit in the embodiment acquires the first information through the security configuration request message, so that the advantages of low frequency of information interaction between the ProSe key management function and the UE and reducing power consumption of the UE are achieved.

In an embodiment, the group security algorithm includes a group encryption algorithm and a group integrity algorithm.

Embodiment 5

Figure 7:
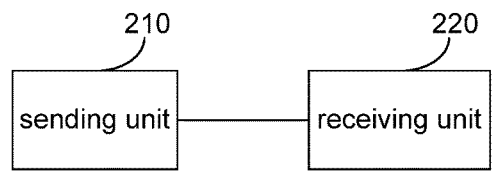
FIG. 7 is a structure diagram of a UE according to an embodiment of the disclosure.

As shown in FIG. 7, the embodiment provides UE, which includes:

a sending unit 210, configured to send first information indicating security capability of a UE to a ProSe key management function, the first information being configured to provide a basis for the ProSe key management function to determine whether to feed back a security configuration response message or a content of the security configuration response message to the UE; and a receiving unit 220, configured to receive the security configuration response message fed back by the ProSe key management function on the basis of the first information.

A specific structure of the sending unit 210 may include a sending antenna or a sending antenna array. A specific structure of the receiving unit 220 may include a receiving antenna or a receiving antenna array.

From the above, the ProSe key management function of the embodiment provides a hardware support for the security configuration method for D2D communication of embodiment 2. The ProSe key management function of the embodiment may be configured to implement any technical solution in method embodiment 2, and also has the advantages of reducing data volume of interaction between the ProSe key management function and the UE, prolonging standby time of the UE, avoiding sending of a group security key and the like, reducing security leakage source, improving communication security and the like.

The first information sent by the sending unit 210 may include a security algorithm set supported by the UE.

The receiving unit 220 receives the security configuration response message in the following two manners and structures according to a communication protocol between the UE and the ProSe key management function.

First:

when the security algorithm set supported by the UE includes a group security algorithm to be sent by the ProSe key management function, the security configuration response message includes the group security algorithm; and when the security configuration algorithm set supported by the UE does not include the group security algorithm to be sent by the ProSe key management function, the security configuration response message includes a security configuration failure indication.

At this moment, the receiving unit 220 is only configured to receive the security configuration response message, and in a specific implementation process, the UE determines whether the UE has security capability of performing D2D communication to be performed and whether the UE performs D2D communication according to the content of the security configuration response message.

Second:

the receiving unit 220 is further configured to receive the security configuration response message including the group security algorithm within a specified time;

the UE further includes a second determination unit; and the second determination unit is configured to, if the security configuration response message is not received within the specified time, determine that security configuration fails.

For the first method, the UE in the embodiment further includes the second determination unit; and a specific structure of the second determination unit may include a timer, configured to count the specified time.

In addition, the sending unit 210 is configured to send a security configuration request message to the ProSe key management function; and the security configuration request message contains the first information indicating the security capability of the UE.

In the embodiment, the sending unit 210 contains the first information in the security configuration request message for sending, so that information amount of interaction is reduced, and standby time of the UE is prolonged.

In the embodiment, the group security algorithm includes a group encryption algorithm and a group integrity algorithm.

Embodiment 6

Figure 1:
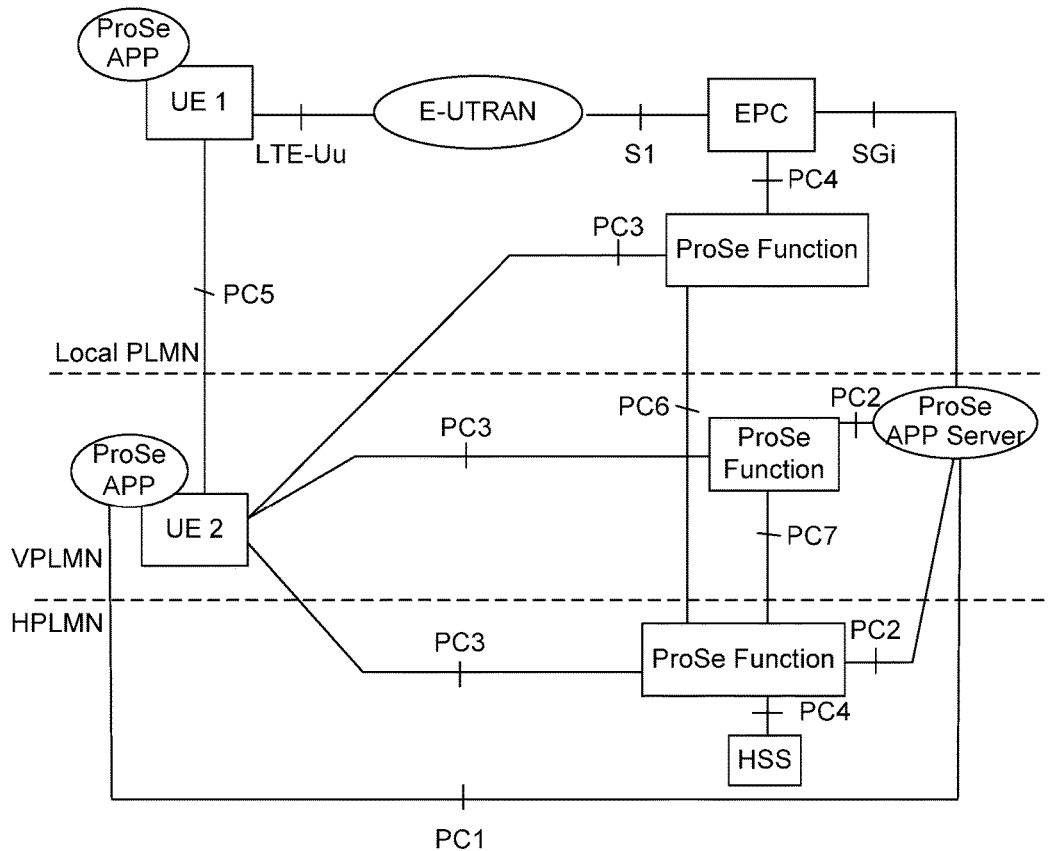
FIG. 1 is a structure diagram of a communication system for D2D communication.
Figure 8:
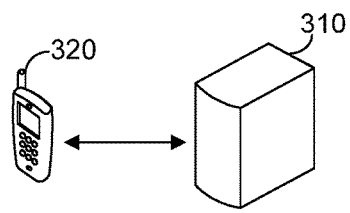
FIG. 8 is a structure diagram of a communication system according to an embodiment of the disclosure.

As shown in FIG. 1 and FIG. 8, the embodiment provides a communication system, which includes:

a ProSe key management function 310, configured to acquire first information indicating security capability of a UE, determine whether to feed back a security configuration response message or a content of the security configuration response message to the UE according to the first information, and send the determined security configuration response message; and the UE 320, configured to receive the security configuration response message.

The ProSe key management function 310 may be network equipment positioned in an EPS, specifically such as a network server and the like. The UE 320 may specifically be a mobile terminal such as a mobile phone or a tablet with a communication function.

The UE 320 and the ProSe key management function 310 are connected through a wireless communication interface, and may specifically be connected through interface PC3 shown in FIG. 1; and the communication system of the embodiment is configured to provide a specific hardware support for the security configuration method for D2D communication in embodiment 3. The communication system of the embodiment may be configured to implement any method in embodiment 3, and also has the advantages of reducing data volume of interaction between the ProSe key management function and the UE, prolonging standby time of the UE, avoiding sending of a group security key and the like, reducing security leakage source, improving communication security and the like.

In a specific implementation process, the first information may include multiple kinds of information, and may preferably include a security algorithm set supported by the UE in the embodiment.

In an embodiment, the UE 320 is further configured to send the first information to the ProSe key management function; and the ProSe key management function is configured to receive the first information sent by the UE to implement acquisition of the first information.

There are multiple manners for the UE 320 to send the first information, and in the embodiment, the UE 320 is specifically configured to send the security configuration request message to the ProSe key management function; the security configuration request message contains the first information indicating the security capability of the UE; and therefore, a frequency of information sending from the UE to the ProSe key management function may be reduced.

After receiving the first information, the ProSe key management function may notify the UE whether the UE has a corresponding security capability and information such as a group security algorithm for D2D communication (such as one-to-many D2D communication) in the following two preferred manners.

First: the ProSe key management function is configured to judge whether the security algorithm set supported by the UE includes a group security algorithm to be sent; when the security algorithm set supported by the UE includes the group security algorithm, determine that the security configuration response message fed back to the UE includes the group security algorithm; and when the security algorithm set supported by the UE does not include the group security algorithm, determine that the security configuration response message fed back to the UE includes a security configuration failure indication.

Second:

the ProSe key management function may be configured to judge whether the security algorithm set supported by the UE includes the group security algorithm to be sent; when the security algorithm set supported by the UE includes the group security algorithm, determine to feed back the security configuration response message to the UE and the security configuration response message including the group security algorithm; and when the security algorithm set supported by the UE does not include the group security algorithm, determine not to feed back the security configuration response message to the UE.

When the second manner is adopted, the operation that the ProSe key management function sends the security configuration response message and the UE receives the security configuration response message is regulated as follows for the first method:

when the ProSe key management function determines to feed back the security configuration response message to the UE, the ProSe key management function is configured to feed back the security configuration response message to the UE within a specified time; and the UE is configured to receive the security configuration response message within the specified time, and if the security configuration response message is not received within the specified time, determine that security configuration fails.

In a specific implementation process, the specific manner to be selected may be determined according to a current requirement, and for example, when the ProSe key management function is excessively loaded, the second manner may be selected; and the first manner may be preferably selected to reduce the power consumption of the UE.

The embodiment of the disclosure further discloses a computer storage medium, in which a computer-executable instruction is stored, the computer-executable instruction being configured for at least one of the methods of embodiment 1 to embodiment 3, specifically for example, to execute at least one of the methods shown in FIG. 2, FIG. 4 and FIG. 5.

The computer storage medium may be a storage medium such as a magnetic tape, a Digital Video Disk (DVD), an optical disk, a USB disk or a mobile hard disk, and is preferably a non-transitory storage medium.

Some specific examples will be provided below with reference to any embodiment of embodiment 1 to embodiment 6.

Figure 9:
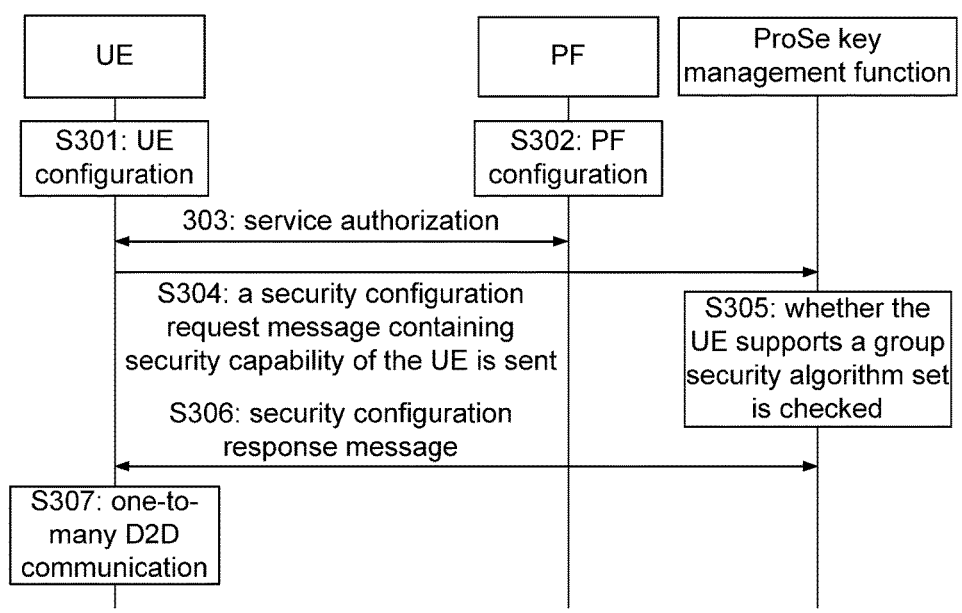
FIG. 9 is a flowchart of a security configuration method for D2D communication according to an example of the disclosure.

As shown in FIG. 9, the security configuration method for D2D communication of the example includes the following steps.

At Step 301: UE configuration operation is executed on the basis of a service requirement, and the UE configuration operation includes that: UE configures a private key, related certificate or root certificate required by communication with a key management function; if the UE cannot implement configuration, a key on a communication identification card (such as a Subscriber Identity Module (SIM) or Universal Subscriber Identity Module (USIM) is adopted to protect an interface between the UE and the key management function; and the USIM is an abbreviation of Universal Subscriber Identity Module and SIM is an abbreviation of Subscriber Identity Module.

At Step 302: ProSe Function (PF) configuration operation is executed for a PF.

The PF configuration operation is implemented as follows: the PF configures a group to which the UE belongs, for example, which group does the UE belongs to, to form subscription information.

At Step 303: service authorization is performed, specifically implemented in a manner that the UE acquires a one-to-many D2D communication parameter from the PF. In the step, the UE also acquires a group identifier of the group that the UE belongs to and an address of the ProSe key management function.

At Step 304: the UE sends a security configuration request message to the ProSe key management function, the security configuration request message containing a group identifier requesting to acquire the key and first information indicating security capability of the UE (the first information may specifically include a security algorithm set supported by the UE).

At Step 305: the ProSe key management function checks whether the UE supports a group security algorithm set, specifically detecting whether the security algorithm set supported by the UE includes the group security algorithm set.

At Step 306: the ProSe key management function feeds back a security configuration response message to the UE.

If the judgment result of Step 305 is YES, the security configuration response message fed back in Step 306 contains a sequenced key information set and a group security algorithm; and key information includes a ProSe Group Key (PGK) identifier, a PGK, an expiration time, a group member identifier of the UE and a security algorithm set adopted to protect data when the UE sends and receives the data.

If the judgment result of Step 305 is NO, the security configuration response message fed back by Step 306 does not contain information such as the group security set, but contains a security configuration failure indication.

At Step 307: when the security configuration response message contains the information such as the group security algorithm, the UE performs one-to-many D2D communication.

Figure 10:
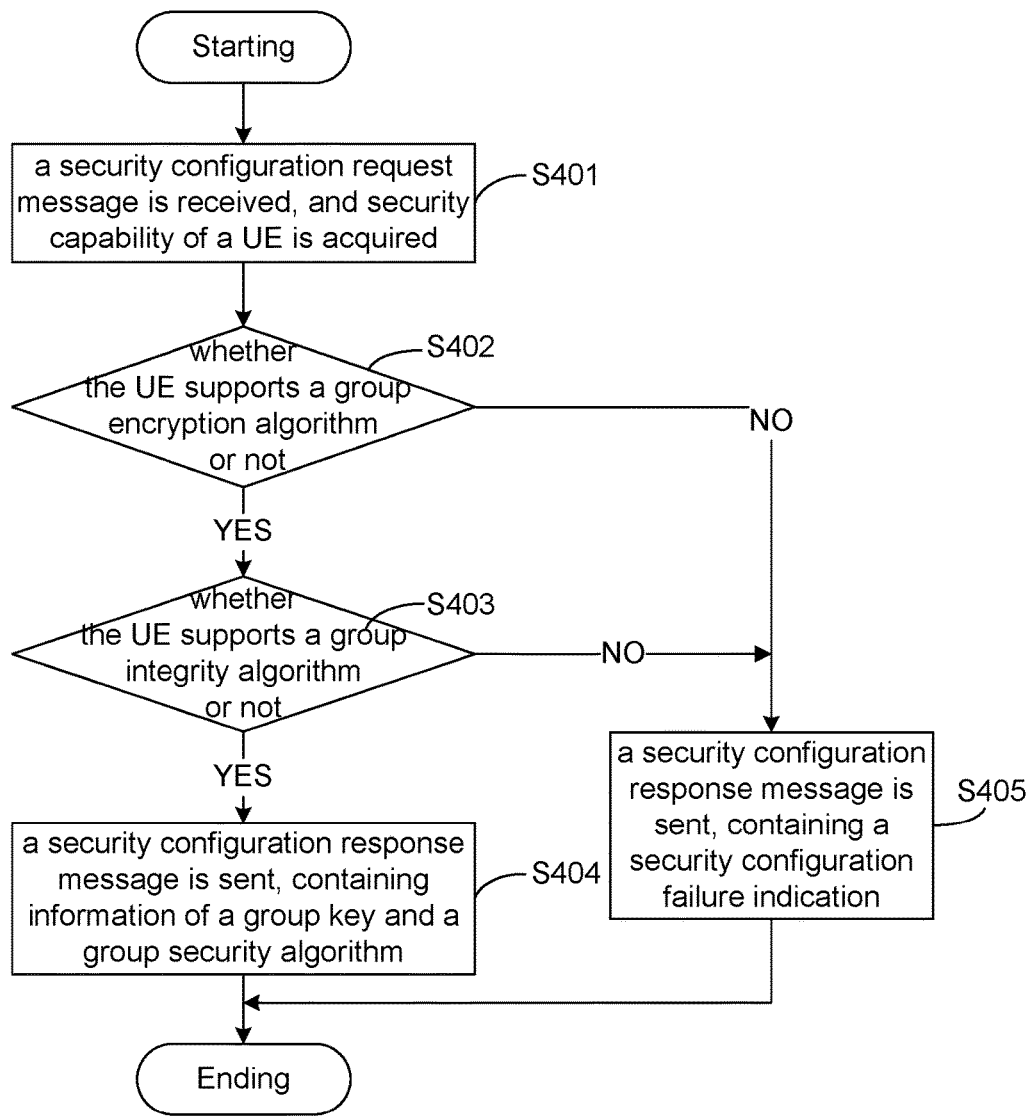
FIG. 10 is a flowchart of a ProSe key management function determining whether a UE supports a group security algorithm according to an example of the disclosure.

FIG. 10 shows steps of a ProSe key management function processing a security configuration request, specifically including:

Step 401: the ProSe key management function receives a security configuration request message, and acquires security capability of a UE (such as a security algorithm set supported by the UE);

Step 402: the ProSe key management function judges whether the UE supports a group encryption algorithm and a group integrity algorithm, and Step 403 is executed if the judgment result is YES, otherwise Step 405 is executed;

At Step 403: the ProSe key management function judges whether the UE supports the group integrity algorithm, and Step 404 is executed if the judgment result is YES, otherwise Step 405 is executed;

At Step 404: the ProSe key management function sends a security configuration response message to the UE, the message containing information such as a group key and a group security algorithm; and At Step 405: the ProSe key management function sends a security configuration response message to the UE, the message containing a security configuration failure indication.

In a specific execution process, there is no specification about a sequence of Step 403 and Step 404. The two steps may be executed at the same time, or one of the steps may be executed at first and then whether to execute the other step may be determined according to the execution result of the first step.

In some embodiments provided by the disclosure, it should be understood that the disclosed devices and methods may be implemented in other forms. The device embodiments described above are only schematic, and for example, division of the units is only logic function division, and other division manners may be adopted during practical implementation. For example, multiple units or components may be combined or integrated into another system, or some characteristics may be neglected or not be executed. In addition, coupling or direct coupling or communication connection between each displayed or discussed component may be indirect coupling or communication connection implemented through some interfaces, equipment or units, and may also be electrical and mechanical or other forms.

The units described as separate parts may or may not be physically separated, and parts displayed as units may or may not be physical units, and namely may be located in the same place, or may also be distributed to multiple network units. Part or all of the units may be selected to achieve a purpose of the solutions of the embodiment according to a practical requirement.

In addition, each function unit in each embodiment of the disclosure may be integrated into a processing unit, or may exist independently. Alternatively, two or more than two units may be integrated into a unit. The integrated unit may be implemented in a hardware form or in the form of combining hardware function unit and software function unit.

Those skilled in the art should know that: all or part of the steps of the method embodiment may be implemented by hardware related with program instructions. The program instructions may be stored in a computer-readable storage medium, and the program instructions are executed to execute the steps of the method embodiments as described above. The storage medium includes: various media capable of storing program codes, such as mobile storage equipment, a Random Access Memory (RAM), a Read-Only Memory (ROM), a magnetic disk or a disk.

The above are only the preferred embodiment of the disclosure and not be intended to limit the scope of protection of the disclosure. Any modifications made according to the principle of the disclosure shall fall within the scope of protection of the disclosure.

What is claimed is:

1. A security configuration method for Device to Device (D2D) communication, comprising:
   receiving, by a Proximity-based Service (ProSe) key management function device, first information indicating security capability of a User Equipment (UE) from the UE; wherein the first information comprises a security algorithm set supported by the UE; and
   judging, by the ProSe key management function device, whether the security algorithm set supported by the UE comprises a group security algorithm to be sent according to the security capability information of the UE;
   When the security algorithm set supported by the UE does not comprise the group security algorithm, determining, by the ProSe key management function device, not to feed back a security configuration response message or to feed back a security configuration response message including a security configuration failure indication that does not include the group security key to the UE.

2. The method according to claim 1, wherein
   when the security algorithm set supported by the UE comprises the group security algorithm, determining that the security configuration response message fed back to the UE comprises the group security algorithm.

3. The method according to claim 1, wherein:
   when the security algorithm set supported by the UE comprises the group security algorithm, the security configuration response message fed back to the UE comprises the group security algorithm.

4. A security configuration method for Device to Device (D2D) communication, comprising:
   sending first information indicating security capability of a User Equipment (UE) to a Proximity-based Service (ProSe) key management function device, the first information being configured to provide a basis for the ProSe key management function device to judge whether a security algorithm set supported by the UE comprises a group security algorithm to be sent and to determine not to feed back a security configuration response message or to feed back a security configuration response message including a security configuration failure indication that does not include the group security key to the UE when the security algorithm set supported by the UE does not comprise the group security algorithm; wherein the first information comprises the security algorithm set supported by the UE; and receiving the security configuration response message fed back by the ProSe key management function device on the basis of the first information;

receiving the security configuration response message comprising the group security algorithm within a specified time; and if the security configuration response message is not received within the specified time, determining that security configuration fails.

5. The method according to claim 4, wherein when the security algorithm set supported by the UE comprises the group security algorithm to be sent by the ProSe key management function device, the security configuration response message comprises the group security algorithm; and when the security algorithm set supported by the UE does not comprise the group security algorithm to be sent by the ProSe key management function device, the security configuration response message comprises the security configuration failure indication without sending the group security key.

6. The method according to claim 4, wherein sending the first information indicating the security capability of the UE to the ProSe key management function device is implemented by:

sending a security configuration request message to the ProSe key management function device, the security configuration request message containing the first information indicating the security capability of the UE.

7. A Proximity-based Service (ProSe) key management function device, comprising:

a processor; and a memory for storing instructions executable by the processor;

wherein the processor is configured to: receive first information indicating security capability of a User Equipment (UE) from the UE; wherein the first information comprises a security algorithm set supported by the UE; and judge whether the security algorithm set supported by the UE comprises a group security algorithm to be sent according to the security capability information of the UE;

When the security algorithm set supported by the UE does not comprise the group security algorithm, determine not to feed back a security configuration response message or to feed back a security configuration response message including a security configuration failure indication that does not include the group security key to the UE.

8. The ProSe key management function device according to claim 7, wherein the processor is further configured to:

when the security algorithm set supported by the UE comprises the group security algorithm, determine that the security configuration response message fed back to the UE comprises the group security algorithm.

9. The ProSe key management function device according to claim 7, wherein the processor is further configured to:

when the security algorithm set supported by the UE comprises the group security algorithm, determine that the security configuration response message fed back to the UE comprises the group security algorithm.

10. The ProSe key management function device according to claim 7, wherein the processor is configured to receive a security configuration request message sent by the UE; and the security configuration request message contains the first information indicating the security capability of the UE.

11. A User Equipment (UE), comprising:

a processor; and a memory for storing instructions executable by the processor;

wherein the processor is configured to send first information indicating security capability of the UE to a Proximity-based Service (ProSe) key management function device, the first information being configured to provide a basis for the ProSe key management function device to judge whether a security algorithm set supported by the UE comprises a group security algorithm to be sent and to determine not to feed back a security configuration response message or to feed back a security configuration response message including a security configuration failure indication that does not include the group security key to the UE when the security algorithm set supported by the UE does not comprise the group security algorithm; wherein the first information comprises the security algorithm set supported by the UE; and receive the security configuration response message fed back by the ProSe key management function device on the basis of the first information;

wherein the processor is further configured to receive the security configuration response message comprising the group security algorithm within a specified time; and if the security configuration response message is not received within the specified time, determine that security configuration fails.

12. The UE according to claim 11, wherein when the security algorithm set supported by the UE comprises the group security algorithm to be sent by the ProSe key management function device, the security configuration response message comprises the group security algorithm; and when the security algorithm set supported by the UE does not comprise the group security algorithm to be sent by the ProSe key management function device, the security configuration response message comprises the security configuration failure indication without sending the group security key.

13. The UE according to claim 11, wherein the processor is configured to send a security configuration request message to the ProSe key management function device, the security configuration request message containing the first information indicating the security capability of the UE.

* * * * *